United States Patent [19]

Hicks, Jr.

[11] Patent Number: 4,630,889
[45] Date of Patent: Dec. 23, 1986

[54] POLARIZATION LOCKED OPTICAL FIBER AND METHOD

[75] Inventor: John W. Hicks, Jr., Northboro, Mass.

[73] Assignee: Polaroid Corporation, Cambridge, Mass.

[21] Appl. No.: 602,739

[22] Filed: Apr. 23, 1984

Related U.S. Application Data

[63] Continuation-in-part of Ser. No. 549,875, Nov. 9, 1983, which is a continuation-in-part of Ser. No. 241,861, Mar. 9, 1981, abandoned.

[51] Int. Cl.⁴ .............................................. G02B 6/16
[52] U.S. Cl. .............................. 350/96.30; 65/3.11; 350/96.16; 350/96.32; 350/96.33
[58] Field of Search ............... 350/96.16, 96.29, 96.30, 350/96.31, 96.32, 96.33, 96.34; 65/3.11, 3.13; 455/610, 612

[56] References Cited

U.S. PATENT DOCUMENTS

| Re. 28,664 | 12/1975 | Miller | 350/96.32 |
| 3,535,017 | 10/1970 | Miller | 350/96.30 |
| 3,877,912 | 4/1975 | Shiraishi et al. | 350/96.33 X |
| 4,046,537 | 9/1977 | Deserno et al. | 65/2 |
| 4,179,189 | 12/1979 | Kaminow et al. | 350/96.33 |
| 4,274,854 | 6/1981 | Pleibel et al. | 65/2 |
| 4,307,938 | 12/1981 | Dyott | 350/96.30 |
| 4,315,666 | 2/1982 | Hicks, Jr. | 350/96.33 X |
| 4,354,736 | 10/1982 | Maklad et al. | 350/96.32 |
| 4,395,270 | 7/1983 | Blankenship et al. | 65/3.12 |
| 4,401,363 | 8/1983 | Barlow | 350/96.30 |
| 4,415,230 | 11/1983 | Keck | 350/96.33 |
| 4,516,828 | 5/1985 | Steele | 350/96.16 |
| 4,557,553 | 12/1985 | McLandrich | 350/96.16 X |

FOREIGN PATENT DOCUMENTS

2542587 4/1977 Fed. Rep. of Germany ... 350/96.32

*Primary Examiner*—John Lee
*Attorney, Agent, or Firm*—David R. Thornton

[57] ABSTRACT

A polarization locked optical fiber having a fiber core suspended by a thin cladding web within a tube with a prestress acting along the web to fixedly polarize the core. Preferably, the tube and web are glass materials having different thermal characteristics to provide a built-in stress upon drawing of the web and tube assembly. In the preferred method, an optical fiber preform is machined to a rectangular form and drawn within an enclosing tube to provide the stressed web arrangement.

21 Claims, 14 Drawing Figures

POLARIZATION LOCKED OPTICAL FIBER AND METHOD

CROSS REFERENCE TO RELATED APPLICATIONS

This is a continuation-in-part of U.S. application Ser. No. 549,875, filed Nov. 9, 1983 which is, in turn, a continuation-in-part of U.S. application Ser. No. 241,861, filed Mar. 9, 1981 and now abandoned.

BACKGROUND OF THE INVENTION

This invention relates to optical waveguides. More particularly, it concerns polarized optical waveguides particularly suited for use in single-mode optical communication transmission networks and a method for making such waveguides.

Single-mode propagation of electromagnetic energy at frequencies within the range varying from near infrared to near ultraviolet is known to represent a quantum increase over multi-mode propagation of such energy in the information handling capacity of optical communication systems. The major advantage of single-mode as against multi-mode propagation of light energy lies in the avoidance of signal deterioration due to dispersion caused by differences in velocities between propagated modes in multi-mode systems. In other words, a signal such as a sharp pulse representing a bit of information supplied to one end of a single mode waveguide, will appear as substantially the same pulse at the other end of the same waveguide assuming that propagation is not adversely affected by external perturbations. The same signal supplied to one end of a multi-mode waveguide isolated from external perturbations, however, will appear as a pulse in each of the multiple modes which arrive at the end of a multi-mode waveguide at different intervals of time. Because of the resulting increased length of each transmitted pulse or bit of information, the rate of information transmission in multi-mode waveguides is severely limited.

Single-mode optical waveguide fibers have been formed to provide to some degree pre-established polarization axes to mitigate the effect of external perturbations and for other reasons. Though initially non-circular core configurations of elliptical or rectangular cross-sections were used to obtain limited polarization, more recently compressive lateral stressing of the waveguide core has been advanced as providing a higher degree of polarization. The lateral compressive stress develops birefringence in the waveguide core, causing the index of refraction for light polarized parallel to the applied force to be increased relative to the refractive index for light polarized perpendicular to the direction of the applied force. In this respect, the disclosures of U.S. Pat. Nos. 4,179,189 to Kaminow, 4,354,736 to Maklad, 4,415,230 to Keck, and several of the prior art references cited therein, are exemplary. It is not known, however that the prior art techniques for polarizing optical waveguides have achieved a degree of polarization locking needed to assure that the measure of pre-established or locked polarization will always be sufficiently retained, or exceed the measure of unwanted polarization resulting from external perturbations in a manner to preserve the initial characteristics of a signal transmitted throughout the length of a waveguide subject to such external perturbations.

SUMMARY OF THE INVENTION

In accordance with the present invention, a single-mode optical waveguide structure and method for its formation are provided by an optical fiber core which is constantly and permanently loaded by diametrically applied force to effect stress birefringence believed adequate to ensure polarization locking on essentially fixed orthogonal axes irrespective of external perturbations to be normally anticipated in an operable optical communications system. The waveguide structure, moreover, facilitates both butt and lateral coupling of two or more fiber lengths used, for example, as a trunkline in a communications network and also accommodates lateral coupling of branchlines or taps intermediate the ends of a single fiber length.

Broadly, the waveguide comprises an optical fiber core suspended by a thin, rigid web or span which is under prestress within an outer tube. Advantageously, the thickness of the web is made thin as compared to its width as measured across the tube inner diameter so that the axis of polarization is inherently restricted to a small angle of deviation from the plane of the web whereby any birefringing effect on the core due to variations in the angle (as distinct from the magnitude) of external perturbation on the overall fiber is essentially nullified.

Preferably, the web and tube are drawable glass materials, with at least portions of the span differing in thermal characteristics, such as in thermal coefficient of expansion annealing point or viscosity curve, etc., from adjacent portions of the outer tube so that as the waveguide assembly is cooled during drawing, a permanent polarizing stress is created on the core along the direction of the web. Advantageously, the tube inner diameter is made large as compared to the web thickness such that operation of the stress along the thin web tends to markedly reduce or severely limit shifting of the polarization axes due to external forces applied to the outer tube. The latter is also controlled in the preferred embodiment by making the external tube relatively thick-walled as compared to the web thickness.

While not essential to practice of the invention, the core of the waveguide fiber is preferably completely embedded centrally within a cladding web which, while still remaining thin, is of a thickness adequate to enclose the core physically and to ensure propagation of single-mode light energy along the core as a result of a refractive index differential between the respective materials of the core and cladding. The core enclosing cladding web, in turn, is oriented across the interior of a relatively thick cladding tube having a thermal coefficient of expansion (TCE) different from that of the cladding web. As a result, the cladding web and the core carried thereby are laterally stressed so that the core becomes birefringent to lock the polarization axes of the core.

Space beween the outer cladding tube and the cladding web may receive a coupling link by which adjacent ends of two fiber waveguides may be connected by lateral or evanescent wave coupling. Alternatively, an arcuate segment of the cladding tube may be removed such as by etching or grinding to expose the cladding web for a short length intermediate the ends of the waveguide to provide for a laterial coupling of a tap or branch to the fiber waveguide serving as a trunkline in a communications system or network.

In forming the fiber waveguide, a clading web and core preform is preferably first made with an oblong or rectangular cross-section dimensionally proportional to the cladding web in the fiber waveguide product. This may be accomplished using conventional techniques presently used to provide a circular preform from which single-mode fibers are normally drawn but by grinding opposite sides of such a circular preform to leave parallel chordal flats on opposite sides of the central core. The generally rectangular cladding and core preform is inserted in a tubular preform, again dimensioned in proportion to the dimensions of the tubular cladding of the fiber waveguide product, and the assembly drawn down to the final dimensions of the fiber waveguide. Preferably, the tube is selected to be of a higher TCE than that of the cladding web so that on cooling, contractions of the tube results in substantial compessive loading of the cladding web now extending across the inside of the thermally contracted tube.

A principal objective of the present invention is the provision of a single-mode optical waveguide structure and method by which polarization locking is assured in the optical core. Other objects and further scope of applicability of the present invention will become apparent from the detailed description to follow taken in conjunction with the accompanying drawings in which like parts are designated by like reference numerals.

DETAILED DESCRIPTION OF THE PREFERRED EMBODIMENTS

Figure 1:
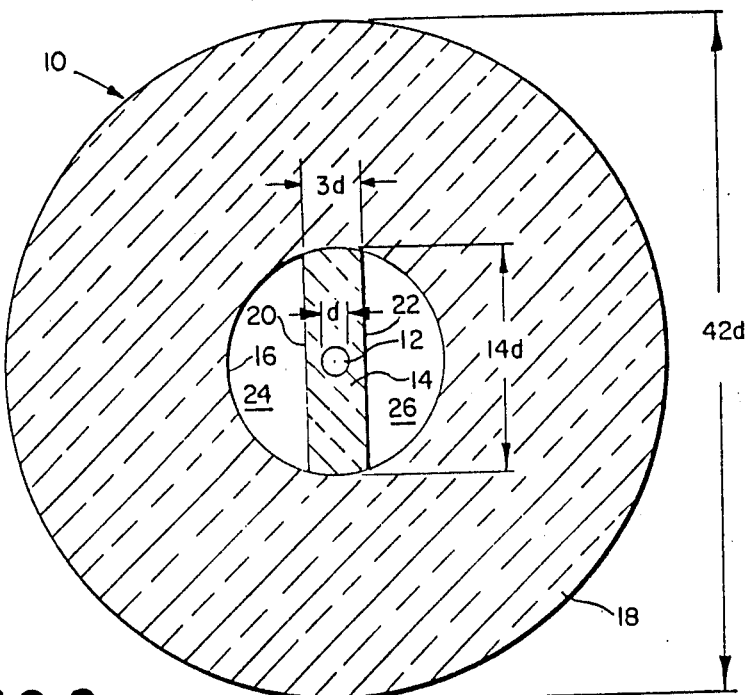
FIG. 1 is an enlarged cross-section of a waveguide formed in accordance with the present invention.

An embodiment of a single-mode optical waveguide fiber in accordance with the present invention is illustrated in cross-section in FIG. 1 of the drawings and generally designated therein by the reference numeral 10. As shown in FIG. 1, the waveguide structure includes a circular core 12 contained or embedded centrally within an internal span or cladding web 14, oblong in cross-section and extending diametrically across the cylindrical inner surface 16 of a relatively thick tubular member or tube 18. The side walls 20 and 22 of the web 14 define with the inside surfaces 16 of the tube 18 a pair of elongated chambers 24 and 26 each having a chordal segment configuration in cross-section. In accordance with well-known optical waveguide practice, the core 12, as well as the cladding web 14, are formed of high purity light transmissive materials such as pure fused silica with one or the other of the core 12 and at least adjoining portions of the web 14 being doped so that the index of refraction of the core 12 exceeds the refractive index of the adjoining cladding of the web 14.

The material of the tube 18 may also be fused silica having an index of refraction the same as the web portion 14 or it may be of some other glass having an index of refraction different than that of the cladding web 14. In accordance with the present embodiment, however, it is important primarily that the material of the tube 18, or at least portions adjacent the web 14, have a thermal characteristic, for example, a thermal coefficient of expansion (TCE), different from portions of the cladding web 14 such that upon formation of the optical waveguide 10 in accordance with the preferred method to be described below, the cladding web portion 14 adjoining the core 12 is placed under stress by diametric forces acting along the cladding web 14, between it and the tube 18. While the stress on the cladding web 14 may be tensile, such as where the TCE of the tube 18 is less than that of the cladding web 14, it is preferred that the cladding web 14 and thus the core 12 be placed under compressive loading, for example, as a result of the TCE of the tube 18 being higher than that of the web 14. The principal reason for this preference is that glass is stronger in compression or, that is, exhibits a significantly higher resistance to compressive stressing than it does to tensile stressing. On the other hand, while this produces tensile loading on the tube 18, such loading is adequately borne by the availability of a relatively large quantity of material in the tube.

To illustrate, by way of example, the preferred relative dimensions of the waveguide components thus identified in FIG. 1, the dimension d represents the diameter of the core 12 which, for example, may be 5 microns. The thickness of the cladding web 14 is, for example, 3 times the core diameter or 3d to provide an adequate amount of cladding completely enveloping the core 12 to assure efficient, low loss propagation of single-mode light energy along the core in a manner dependent on the differential in the index of refraction of the core 12 and the cladding web 14. Thus, in the preferred embodiments, the thickness of the cladding web 14 is such as to extend sufficiently beyond the core 12 so that air filling the cavities 24 and 26 is not essentially relied on as a cladding material necessary for single-mode propagation of energy along the core 12. The width of the web 14 extending across the inside diamter of the tube 18 is approximately 14 times the diameter of the core or 14d as noted in FIG. 1. Thus, the inner diameter of the tube 18, and hence the width of the web, is at least 3 to 4 times the thickness of the web (and specifically 4½ times in the values noted in FIG. 2)

so that any deviation of stress angle is limited to less than 20° and, preferably, under 15° from the center plane of the web.

The preferred outside diameter of the tube 18 is 42d thus providing a radial dimension or thickness of material in the tube 18 more than four times the web thickness and approximately equal to the diametric dimension of the web 14. As indicated, while the relative dimensions shown in FIG. 1 are preferred, these relative dimensions may vary depending on materials employed in the cladding web 14 and in the tube 18.

Figure 2:
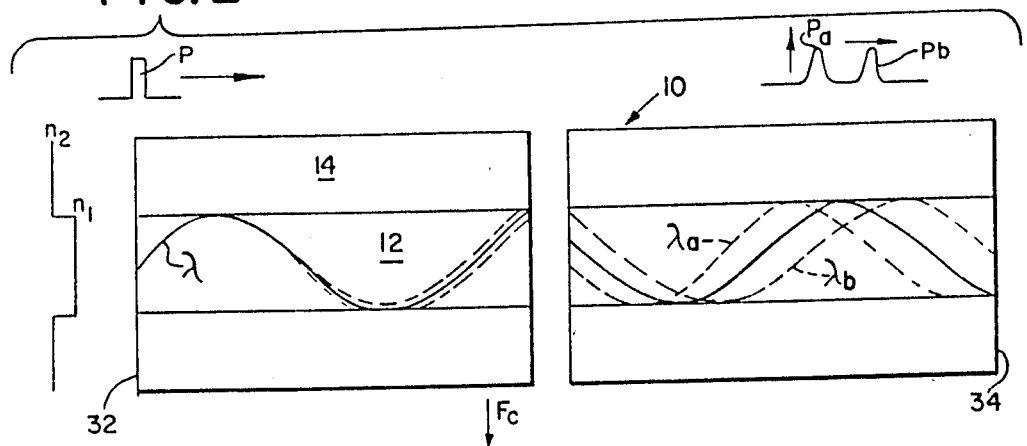
FIG. 2 is a schematic view illustrating the propagation of polarized light energy along a single-mode fiber waveguide.
Figure 3:
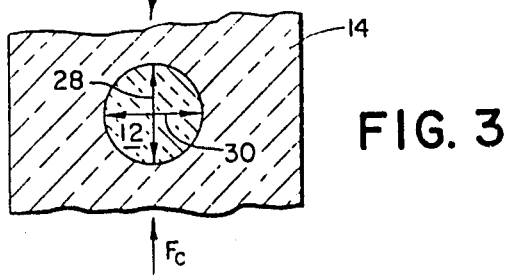
FIG. 3 is an enlarged fragmentary cross-section illustrating the core and a portion of cladding web in the waveguide of FIG. 1.

The effect of the built-in stress or loading by the tube 18 through the cladding web 14 to the core 12 during single-mode operation of the waveguide 10 may be understood by reference to FIGS. 2 and 3 of the drawings. In FIG. 2, the core 12 and cladding web 14 are illustrated schematically as having indices of refraction $n_1$ and $n_2$, respectively. In FIG. 3, the core is shown having two mutually orthogonal transverse axes 28 and 30 which represent polarization axes due to stress birefringence caused by the compressive loading $F_c$.

Single-mode light energy of a specific frequency or wavelength introduced to the input end 32 of the waveguide 10 and propagated along the length thereof to an output end 34, assuming no stress birefringence or polarization in the core 12, is represented by the single solid line wave $\lambda$ in FIG. 2. Stress birefringence and polarization on the transverse axes 28 and 30 resulting from diametric compressive loading of the core 12 under the force $F_c$, however, causes the same wavelength of single-mode light energy to be split along the axes 28 and 30 into polarized waves $\lambda_a$ and $\lambda_b$, represented respectively by dashed lines in FIG. 2. This division of the light energy propagated along the waveguide 10 is due to a difference in the propagation constants on the two axes 28 and 30 of polarization. Specifically, the axis 28 which lies parallel to the direction of the compressive force $F_c$ has an apparent index of refraction which is higher than the apparent index of refraction on the axis 30. Thus, light energy will propagate at a higher phase velocity on the polarization axis 28 than on the axis 30.

The importance of polarization may be further appreciated with reference to FIG. 2 if it is assumed that the wavelength $\lambda$ at the input end 32 of the waveguide is modulated to carry a pulse P along the length of the waveguide 10. The pulse P, representing a bit of information, will appear as two pulses $P_a$ and $P_b$ at the output end 34 of the waveguide, one for each of the individual polarizations propagated on the respective polarization axes 28 and 30.

In accordance with the present invention, the waveguide construction illustrated in FIG. 1 enables a measure of stress birefringence adequate to effect polarization locking on the axes 28 and 30 throughout the full length of the waveguide 10 irrespective of external perturbations having a tendency to upset the direction of polarization. As a result, one or the other or both of the two polarized waves $\lambda_a$ or $\lambda_b$ may be used as carrier waves for information without loss of signal integrity from one end of the waveguide to the other.

Advantageously, suspension of the core 12 by the web 14 with built-in stress on the core along the direction of the web, particularly in combination with the comparatively thick wall tube 18, provides a locked-in polarization characteristic which is relatively immune to stresses external to the waveguide 10. Broadly, the core is joined to or suspended within the surrounding tube or jacket only along directions (one as in FIG. 1 and two as later explained with regard to FIG. 12) which are prestressed such that any forces applied to the enclosing tube can only reach or effect the core by operating along these fixed directions. Consequently, to have a depolarizing effect, such forces when resolved along such directions, must be opposite to and significant relative to the prestress force. Stated otherwise, because of the bridge or span construction, all external forces on the waveguide 10 must be resolved along the direction of the span in order to have any effect on the core prestress, and the prestress within the web 14 is easily made sufficiently larger in conjunction with the thick wall tube 18 to render negligible any change in the prestress from external stress anticipated in normal usage of waveguides. A difference in final compression of 0.001 resulting, for example, from a difference in TCE of $5 \times 10^{-7}/°C$. between the web 14 and tube 18 will produce suitable polarization locking. As previously indicated, glasses having different viscosity curves or annealing points can be utilized to produce appropriate stress, as well as rapid cooling to cause a difference in cross-sectional temperature.

While the core 12 is preferably embedded within the web 14 such that portions of the latter which adjoin the core operate as core cladding, it should be understood that the air spaces of chambers 24 and 26 could extend to the core edges to thereby provide some of the core cladding. Enclosing the core with at least a thin layer of cladding glass is preferable, however, to preclude the possibility of core contamination and to insure efficient propagation. The thickness of the cladding web as noted previously is made approximately three times the core diameter, which provides a cladding thickness between the core and the air spaces of chambers 24 and 26, equal to the core diameter to insure propagation in the core while still permitting evanescent coupling to the core as explained below.

Thus, some encompassing glass cladding is desired for reduced core contamination and low transmission loss. Consequently, from a point of view of merely obtaining fixed polarization such as in short fiber lengths where surface contamination of the core and hence losses may be tolerated, a web which does not provide enclosing cladding can suffice. However, for transmission lines where low loss is also very important, a clad core as noted above is preferred.

Figure 4:
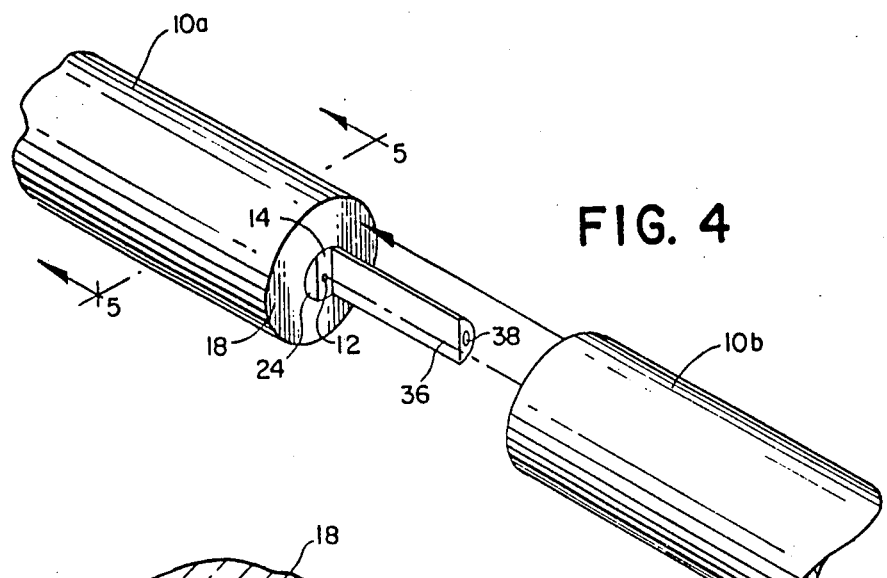
FIG. 4 is an exploded perspective view illustrating lateral coupling of the ends of two fiber waveguides of the present invention using a connecting link.
Figure 5:
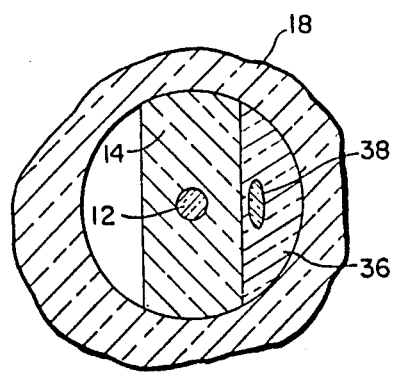
FIG. 5 is an enlarged cross-section on line 5—5 of FIG. 4.

While butt coupling of two waveguides is quite practical, in FIGS. 4 and 5 of the drawings, an arrangement for lateral coupling of two waveguides 10a and 10b of the present invention is also shown. In particular, a coupling link 36 such as a D-shaped fiber, having a polarized core 38, for example, an elliptical core, is shaped to fit, and preferably, complement the chordal segment cross-section of one or the other of the two cavities 24 and 26 in the respective waveguides. The coupling link 36 is selected to be of an adequate length to effect evanescent wave coupling of the link core 38 to both cores 12a and 12b of the respective waveguides 10a and 10b. By using a polarized core 38 in the link 36, the energy transferred between the waveguides 10a and 10b may be selected to correspond to one of the polarizations $\lambda_a$ or $\lambda_b$ as discussed above with respect to FIG. 2 of the drawings.

Figure 6:
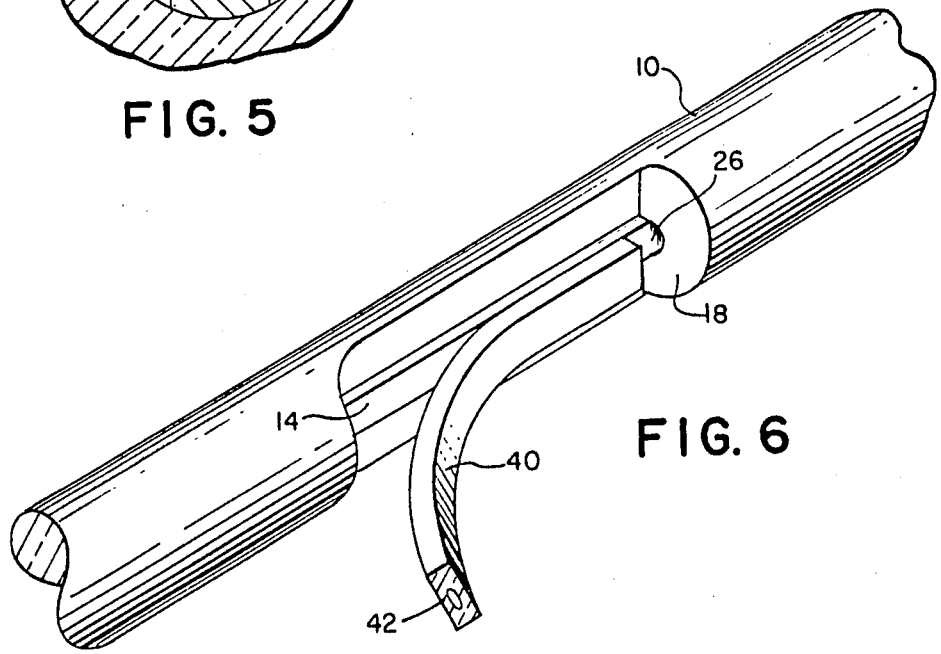
FIG. 6 is a fragmentary perspective view illustrating a coupling intermediate the ends of an optical waveguide of the present invention.

In FIG. 6 of the drawings, an arrangement is shown for coupling the waveguide 10 to a tap 40 intermediate the ends of the waveguide 10. As shown, an arcuate segment of short length of the tube 18 is removed either by etching or by grinding to expose one side of the cladding web 14. The tap 40 is secured along the exposed side of the cladding web 14 to effect lateral or evanescent wave coupling between the core 12 and the core 42 of the tap 40. Though not shown, the region of the juncture of the waveguide 10 and tap 40 may be covered by appropriate filler material having an index of refraction comparable to that of the cladding web 14.

For very short coupling length, the matching polarization of the tap is not important; however, for longer lengths suitable for good coupling, the phase velocity of the line and coupler link should be matched. Although the phase velocity of one polarization state may easily be matched (in which case two lateral taps, one for each polarization may be employed) it is more difficult to match both states within the single coupling link. However, where the match is not quite suitable or precise enough, it can be improved by bending the link.

Advantageously, the web structure is particularly suited to enhanced coupling. That is, the link is preferably made of sufficient thickness to almost bridge the air gap between the web and wall. Then, the line section and coupling link may be heated and slightly elongated to fuse the link in place, to decrease the core size, and to reduce the spacing between the two cores, the latter two of which enhance coupling.

Prior to describing the preferred method of forming the waveguide illustrated in FIG. 1, it should be noted that while the web 14 and tube 18 are comprised of fused silica (or are at least silica based) which have different thermal characteristics or different treatment, (i.e., different cooling rates) during the cooling and drawing step of the preferred method, many variations in construction are possible while retaining the thin web and suspended core arrangement of the invention. For example, the tube 18 may be two piece construction having a thin inner section fused to the web with an outer compressive jacket of suitable material.

Figure 7:
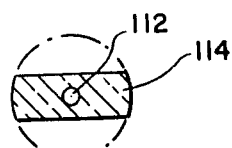
FIG. 7 is a cross-section of the web cladding and core preform used in the method of the present invention.

The method for forming the waveguide 10 of FIG. 1 may be understood by reference to FIGS. 7-10 of the drawings. In FIG. 7, a cladding web and core preform 114 is shown to be dimensionally proportional to the cladding web 14 and core 12 of the waveguide product 10. In order to attain the required degree of optical precision in the materials of the core 12 and cladding web 14, the preform 114 is preferably formed by first developing a circular rod-shaped configuration presently used in preforms for circular waveguides in which both the core and cladding are of pure fused silica and in which one or the other of the core and cladding glass is doped so that the core has a higher index of refraction than that of the cladding. The circular cross-section of the initial configuration is shown by dashed lines in Fig. 7. The final shape of the preform 114 is, therefore, reached by grinding or otherwise removing opposite chordal segments of the initially circular rod.

Figure 8:
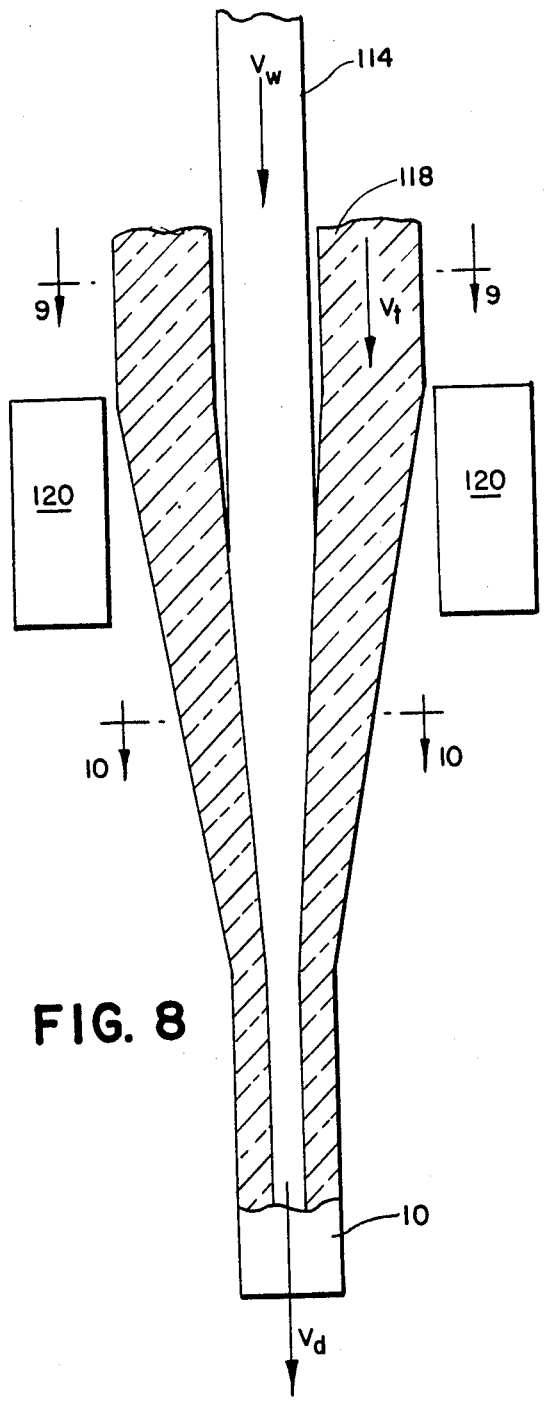
FIG. 8 is a vertical section illustrating in general the method of drawing the optical fiber waveguide of the present invention.
Figure 9:
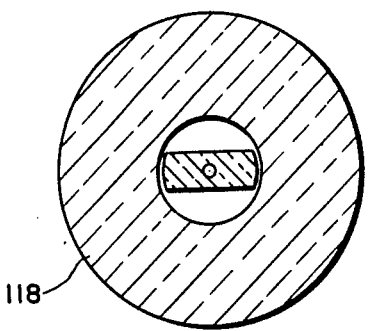
FIG. 9 is a cross-section on line 9—9 of FIG. 8.

A tubular preform 118 is depicted in FIGS. 8 and 9 of the drawings and is also dimensioned generally in proportion to the dimension of the cladding tube of the waveguide product 10. It will be noted, however, that the inside diameter of the preform 118 exceeds the width or diametric dimension of the web preform 114 so that the latter will pass through the tubular preform 118. In practice, the width of the preform 114 may approximate ¼" whereas the inside diameter of the tube 118 may approximate 5/16".

Figure 10:
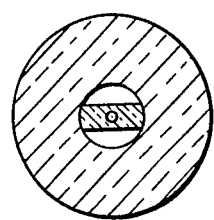
FIG. 10 is a cross-section on line 10—10 of FIG. 8.

In FIG. 8 of the drawings, drawing of the respective preforms 114 and 118 down to the waveguide product 10 is depicted schematically in relation to a furnace 120 or other source of heat adequate to elevate the temperature of both preforms above the melting temperature thereof. In accordance with conventional drawing processes, the velocity $V_D$ at which the waveguide is drawn through the furnace 120 exceeds the velocity at which the preforms are fed to the furnace to effectively reduce the diameter gradually to the final size of the waveguide 10. In accordance with the present invention, however, the velocity $V_W$ at which the web and core preform 114 is advanced or fed to the furnace 120 is in excess of the velocity $V_T$ at which the tubular preform 118 is so fed. In the practice of the method, the feed velocity $V_W$ of the web and core preform 114 is approximately twice the feed velocity $V_T$ of the tubular preform. As a result, the web and core preform is advanced against the inner taper of the molten tubular preform during passage of both preforms through the heating zone defined by the furnace 120. This causes the outside edges of the web and core preform 114 to contact and fuse with the inner surface of the necked-down tubular preform 118 as shown in FIG. 10.

In addition to or as an alternate to the difference in feed to ensure engagement and fusing of both lateral ends of the web to the tube wall, a slight vacuum of 0.1 to 1 lb. may be introduced into the tube during the drawing operation.

To ensure that the web 14 in the final waveguide product 10 will be placed under diametric compressive stress by the tube 18, the TCE of the tubular preform 118 should be greater than the TCE of the cladding web and core preform 114. It is also desirable that the solidification of the centrally disposed cladding web 14 should occur prior to the solidification of the tube 18. It is, therefore, preferred that the material of the tube 18 be of glass having a slightly lower melting temperature than that of the cladding web 114. This is particularly true inasmuch as the normal solidification of glass fiber during drawing is from outside toward the center of the drawn fiber. Where the web 14 is of pure fused silica which has a relatively high melting temperature, selecting the glass of the tubing to have a slightly lower melting temperature will cause the central cladding web to freeze or solidify in advance of freezing or solidification of the outer tube.

Because glass is relatively strong in compression and weak in tension, it is preferred to place the relatively delicate cladding web 14 under compression and to resolve tensile forces in the relatively heavy and thick outer tube 18. It is, of course, possible, and perhaps acceptable, to place the cladding web under tension by appropriate selection of the TCE of the material forming the respective tube and cladding web. Diametric tensile stressing of the cladding web will develop the necessary polarization locking of the core 12, but under conditions which may result in damage of the web 14 due to excessive tensile forces therein. Thus, it is preferred that the web 14 be loaded in compression.

Figure 11:
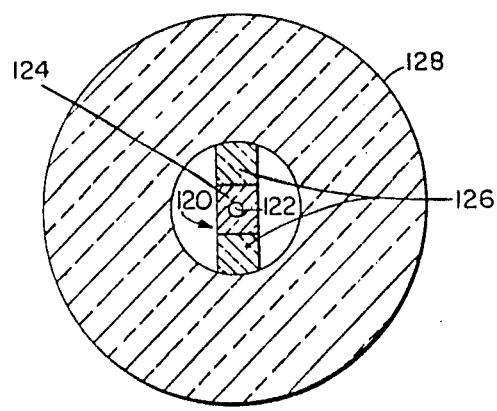
FIG. 11 is an enlarged cross-section of an alternate arrangement of a waveguide having prestress built in to the fiber web.

While the waveguide 10 of FIG. 1 is constructed with a homogeneous tube and a homogeneous web (excluding the core) having different thermal physical characteristics, it should be understood that stress can be provided in the web in keeping with the invention by different characteristics, i.e., different coefficients, of only selected portions of either the tube or the web to permit greater variation in selected materials. For example, an area (not shown) of the tube adjacent and preferably adjoining the web ends and having a higher TCE than the web or tube remainder may be employed to provide compression on the web. However, for such purposes, it is to be preferred that the web itself be varied as illustrated in FIG. 11 wherein a web 120 is provided with a centrally located section 124, enclosing a core 122, of conventional cladding material having a given physical characteristic such as TCE with outboard portions 126 of the web being formed of material, whether of light cladding quality or not, having for example a higher TCE than the cladding section 122 or the outer tube 128. Advantageously, while permitting a wider selection of materials, the waveguide of FIG. 11 may be constructed in a manner similar to that previously described with regard to FIG. 1 and illustrated in FIGS. 7-10, with, however, the web preform being formed prior to grinding by conventional preform forming techniques with first and second layers, representing central section 124 and outer sections 126.

Figure 12:
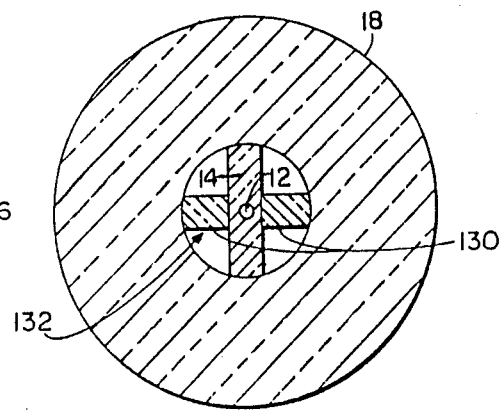
FIG. 12 is an enlarged cross-section of another embodiment of the invention illustrating crossed webs.

Other variations in the polarization locked guide of the invention are possible. For example, as illustrated in FIG. 12, orthogonally crossed webs may be utilized with one bridge providing tension and the other compressive forces on the core. That is, the structure of FIG. 1, in addition to its web 14 (which in conjunction with the tube 18 provides a compressive force on the core), includes web portions 130 forming a web 132 orthogonal to the first web 14 with the second web having a physical characteristic providing tensile forces, i.e., a TCE higher than that of the tube 18 to produce tensile forces during cooling on the core along the direction of the second web and thus normal to the compressive forces achieved by the first web.

One method of constructing the crossed span guide embodiment of FIG. 12 is, for example, to fuse segments 130 of selected ICE to the parallel faces of the previously described flattened preform prior to drawing within the tube 18. Of course, it should be understood that rather than being homogeneous, one or both of the webs 14 and 132 could utilize the dual arrangement illustrated in FIG. 11 and/or adjacent portions of the tube 18 of selected physical characteristic may be appropriately provided as previously noted.

Figure 13:
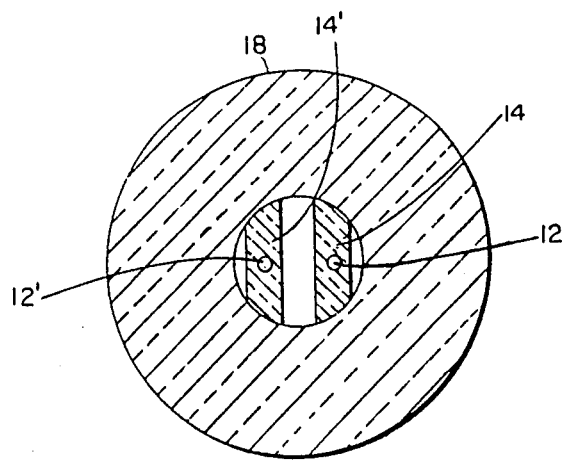
FIG. 13 is an enlarged cross-section of a double core waveguide formed in accordance with the invention.

While the two polarization locked states are available for separate transmission as later described with respect to FIG. 14, the polarization locked structure is also applicable to more than one core-web construction as, for example, is illustrated in FIG. 13 where a pair of webs 14 and 14' suspend enclosed cores 12 and 12', respectively, within tube 18. Preferably, both webs 14 and 14' are of such physical characteristic with respect to the tube 18 as to produce compresive forces on their respective cores during drawing and cooling. Thus, each single mode guide formed by each of the pair of webs is available for separate transmission and, as described below with regard to the single web construction of Fig. 1, each web can, in turn, support independent transmission in either direction along both polarization states.

Figure 14:
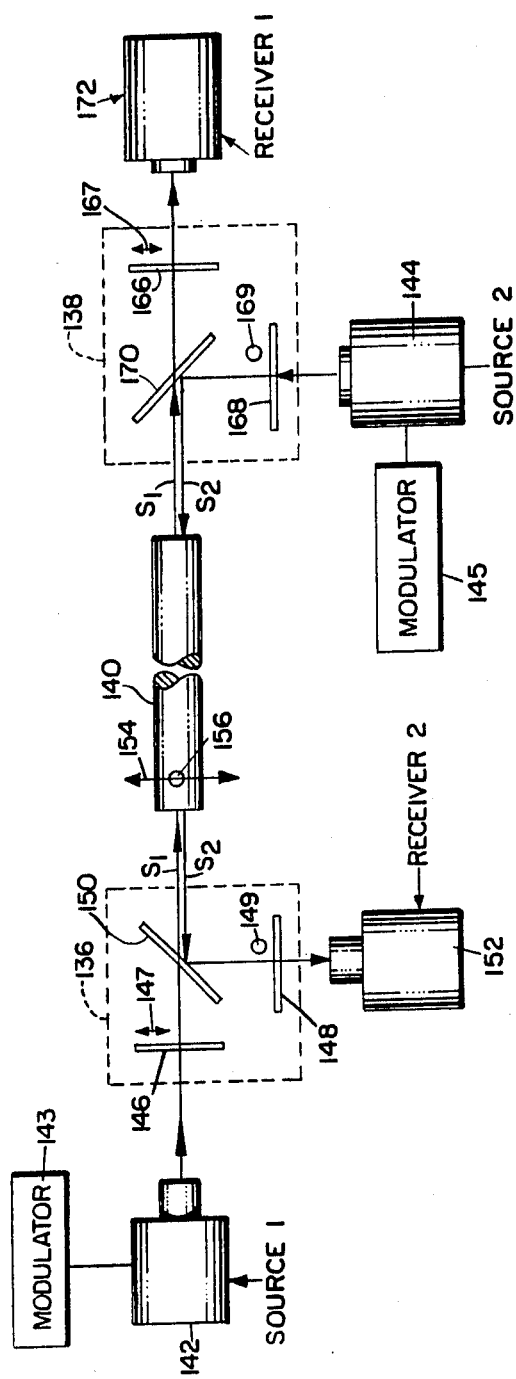
FIG. 14 is a diagrammatic view of a transmission system utilizing the polarized waveguide illustrated in FIG. 1.

As illustrated in FIG. 14, because of their locked charateristic, each polarization state may be utilized for independent transmission. In this arrangement, a fiber 140 constructed, for example, in accordance with the embodiment of FIG. 1, has each polarization state independently driven at opposite ends of the fiber by respective sources 142 and 144, for example, conventioanl laser sources in conjunction with associated modulators 143 and 145 to allow and provide simultaneous forward and backward transmissions for sending and receiving within the same single mode core. Conventional polarized beamsplitters 136 and 138, respectively, input and output the signals designated $S_1$ (from source 142) and $S_2$ (from source 144) at respective ends of the fiber 140. Thus, the polarized beam splitter 136, shown diagramatically to include a pair of plane polarizers 146 and 148 and a beam splitter 150, inputs the "send" signal $S_1$ from source 142 to one Polarized state (designated by arrows 154) of guide core 12 and also delivers the "receive" signal $S_2$ from the other polarized state designated by point 156 to a detector-demodulator or, that is, a receiver 152. To insure separate input and reception of the signals $S_1$ and $S_2$, the polarizers 146 and 148 are oriented to pass light in mutually orthogonal planes which coincide with polarization planes of the fiber, or that is, the essentially parallel to the polarization axis of the fiber web. In the assembly illustrated in FIG. 14, the orientation of polarizer 146 is selected to provide polarization in the vertical plane of the paper (as shown by arrow 147) to coincide with the polarization state 154 of the fiber 140 and the orientation of polarizer 148 provides polarization in a plane directed into the paper (as designated at point 149) to coincide with the plane of the other polarization state 156 of the fiber.

At the other end of the fiber 140, the polarized beam splitter 138 is similarly illustrated as a pair of plane polarizers 166 and 168 and a beam splitter 170 with the polarizer orientation as shown by arrow 167 and point 169 respectively to transmit only signal $S_1$ to a detector demodulator or receiver 172 and input signal $S_2$ from source 144 to the proper polarization state 156 of the fiber.

As shown, the signals $S_1$ and $S_2$, travelling in opposite directions, are preferred for the practical reason of sending and receiving within a single line; however, it should be understood both signals $S_1$ and $S_2$ can also be entered at one end on their separate polarization states and separately received at the other end. For oppositely directed waves as shown in FIG. 14 only polarization of the input is absolutely necessary while polarization of both input and output is clearly required for separation of two commonly directed waves.

While the signals $S_1$ and $S_2$ are entered and received at ends of the fiber 140, it should also be understood that either or both signals could be entered to and/or tapped from the line at any point along its length by means of the lateral tap arrangement described in regard to FIG. 6. In such an arrangement, the polarized beam splitter of FIG. 14 would be unnecessary since the fiber tap and its lateral coupling provide separation of the beams and all that would be required is to input or receive signals from the tap through an appropriately oriented plane polarizer.

In addition to utilizing the tap for coupling to or from the fiber intermediate its ends as noted above, the polarized beam splitter of FIG. 14 may also be replaced for sending or receiving of separate transmissions at the end of the fiber by a pair of taps with appropriate polarizers, or one tap for lateral coupling of one polarized signal and direct injection to the core for the other polarized signal.

In light of the foregoing, it will be appreciated that as a result of the present invention a higher effective single-mode polarization locked optical waveguide and method are provided by which the principal objective, among others, are completely fulfilled. It is contemplated and will be apparent to those skilled in the art from the preceding description that modifications and/or changes may be made in the disclosed embodiments without departure from the invention. Accordingly, it is expressly intended that the foregoing description and accompanying drawings are illustrative of preferred embodiments only, not limiting, and that the true spirit and scope of the present invention will be determined by reference to the appended claims.

What is claimed is:

1. A single-mode optical waveguide comprising a longitudinally extending hollow tubular member, at least one rigid web transversely bridging the inside of said tubular member and extending longitudinally therealong, a core of light transmitting material mounted in said web and extending longitudinally therealong with at least portions of said web adjoining said core having an index of refraction lower than that of said core to enhance single-mode propagation therein, said waveguide having physical characteristics establishing a stress along the bridging direction of said web for exerting an anisotropic force radially on said core along said web direction to effect a polarization locked characteristic within said waveguide since external forces on said waveguide must be resolved generally along said web direction.

2. The invention of claim 1 wherein said web is thin as compared to its transverse width bridging the tubular member.

3. The invention of claim 2 wherein said waveguide is formed by cooling from a relatively high temperature to its operating temperature and at least portions of said tubular member and said web have different physical characteristics selected to exert said force on said core as a result of said cooling.

4. The invention of claim 3 wherein said waveguide is formed by cooling from a relatively high temperature to its operating temperature and at least portions of said tubular member and said web have different thermal characteristics selected to exert said force on said core.

5. The invention of claim 4 wherein said portions have different thermal coefficients of expansion.

6. The invention of claim 5 wherein the thermal coefficient of at least portions of said tubular member adjoining said web are higher than that of at least portions of said web so as to load said web in compression.

7. The invention of claim 4 wherein said web ensheaths said core to provide a minimum cladding therefor.

8. The invention of claim 2 wherein the major dimension or width of said web is several times the diameter of said core, and the radial thickness of said tubular member is approximately equal to or greater than said width of said core.

9. The invention of claim 2 including crossed webs joined at the point of location of said core.

10. The invention of claim 9 wherein said webs are orthogonal to one another.

11. The invention of claim 9 wherein at least portions of said webs are of different physical characteristics from one another so as to produce compressive forces along one web and tensile forces along the other.

12. The invention of claim 2 wherein the thermal coefficient of expansion of said tubular member is higher than that of said web, thereby to load said web and said core in compression.

13. The invention of claim 2 wherein said core is ensheathed in said web, and wherein the minor dimension or thickness of said web is approximately three times the diameter of said core.

14. The invention of claim 13 wherein the major dimension or width of said web approximates fourteen times the diameter of said core.

15. The invention of claim 14 wherein the radial thickness of said tubular member is not less than the width of said web.

16. The invention of claim 1 wherein the width of said web is at least 3 times its thickness.

17. The invention of claim 1 wherein the width of said web is at least 4¼ times its thickness.

18. A single mode optical waveguide comprising:
an elongated core formed of light transmitting material;
an outer tubular member extending lengthwise of said core and spaced radially therefrom; and
means, extending between the outer surface of said core and the inner surface of said butular member in a web-like manner, for defining a cladding ensheathing said core, and for rigidly supporting said core internally of said tubular member, at least portions of said ensheathing and supporting means adjoining said core having an index of refraction lower than that of said core, and at least portions of the materials forming said tubular member and said supporting and ensheathing means having different physical characteristics selected to exert a fixed stress acting along the bridging direction of said supporting and ensheathing means to establish an anisotropic force radially in said core and thereby effect a polarization locked characteristic within said waveguide.

19. The invention of claim 18 wherein portions of said materials forming said tubular member have a higher thermal coefficient of expansion than portions forming said ensheathing and supporting means so as to load portions of said ensheathing and supporting means in compression.

20. The invention of claim 18 wherein adjoining portions of said tubular member and said ensheathing and supporting means are of different thermal expansion coefficients.

21. The method of forming a polarization locked single-mode optical waveguide, said method comprising the steps of:
forming a cladding web and core, optical fiber preform of crossed-web cross-sectional configuration having the core centrally located at the point of crossing of the webs and with at least portions of the material of one of said webs having a different thermal characteristic than at least portions of the material of the other web;
providing a tubular preform having an inside diameter slightly greater than the diameter of said cross-web configuration, the material of said tubular preform having a thermal characteristic different from that of one of said webs;
feeding said preforms to a heating zone and drawing both together from said heating zone with said fiber preform within said tubular preform to reduce the cross-sectional dimension of both and fixedly join them together; and
cooling the drawn materials to a solid state.

* * * * *